(12) United States Patent
Southward et al.

(10) Patent No.: US 9,475,973 B2
(45) Date of Patent: Oct. 25, 2016

(54) PREPARATION OF METAL NANOWIRE DECORATED CARBON ALLOTROPES

(71) Applicant: The United States of America as represented by the Administrator of the National Aeronautics and Space Administration, Washington, DC (US)

(72) Inventors: Robin E. Southward, Stanwood, WA (US); Donavon Mark Delozier, Disputanta, VA (US); Kent A. Watson, New Kent, VA (US); Joseph G. Smith, Jr., Smithfield, VA (US); Sayata Ghose, Sammamish, WA (US); John W. Connell, Yorktown, VA (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 0 days.

(21) Appl. No.: 14/225,757

(22) Filed: Mar. 26, 2014

(65) Prior Publication Data
US 2014/0203206 A1    Jul. 24, 2014

Related U.S. Application Data

(60) Division of application No. 13/082,734, filed on Apr. 8, 2011, now Pat. No. 8,703,235, and a continuation-in-part of application No. 11/710,386, filed on Feb. 23, 2007, now Pat. No. 7,704,553.

(60) Provisional application No. 61/327,189, filed on Apr. 23, 2010, provisional application No. 60/780,173, filed on Mar. 6, 2006.

(51) Int. Cl.
*B32B 5/16* (2006.01)
*B05D 7/00* (2006.01)
(Continued)

(52) U.S. Cl.
CPC . *C09K 5/14* (2013.01); *B22F 9/24* (2013.01); *B82Y 30/00* (2013.01); *B82Y 40/00* (2013.01);
(Continued)

(58) Field of Classification Search
CPC .... B22F 9/24; B22F 2301/05; B22F 1/0018; B82B 3/0014; B82B 3/0076; C01B 31/0206
USPC ........ 427/215, 217, 256; 977/748, 762, 765, 977/782, 890; 428/403, 407
See application file for complete search history.

(56) References Cited

U.S. PATENT DOCUMENTS

| 5,525,568 A | 6/1996 | Yamaguchi et al. |
| 6,680,279 B2 | 1/2004 | Cai et al. |

(Continued)

OTHER PUBLICATIONS

He & Tao, Electrochemical Fabrication of Metal Nanowires, Encyclopedia of Nanoscience and Nanotechnology, vol. X: pp. 1-18, 2003.*

(Continued)

*Primary Examiner* — Holly Le
(74) *Attorney, Agent, or Firm* — Jennifer L. Riley

(57) ABSTRACT

In the method of embodiments of the invention, the metal seeded carbon allotropes are reacted in solution forming zero valent metallic nanowires at the seeded sites. A polymeric passivating reagent, which selects for anisotropic growth is also used in the reaction to facilitate nanowire formation. The resulting structure resembles a porcupine, where carbon allotropes have metallic wires of nanometer dimensions that emanate from the seed sites on the carbon allotrope. These sites are populated by nanowires having approximately the same diameter as the starting nanoparticle diameter.

9 Claims, 1 Drawing Sheet

(51) Int. Cl.
| | |
|---|---|
| C09K 5/14 | (2006.01) |
| B22F 9/24 | (2006.01) |
| B82Y 30/00 | (2011.01) |
| B82Y 40/00 | (2011.01) |
| C01B 31/02 | (2006.01) |
| C01B 31/04 | (2006.01) |
| C08J 5/00 | (2006.01) |
| C22C 1/05 | (2006.01) |
| C22C 1/10 | (2006.01) |
| C22C 26/00 | (2006.01) |
| B22F 1/00 | (2006.01) |

(52) U.S. Cl.
CPC ......... *C01B 31/022* (2013.01); *C01B 31/0206* (2013.01); *C01B 31/0213* (2013.01); *C01B 31/04* (2013.01); *C01B 31/0423* (2013.01); *C08J 5/005* (2013.01); *C22C 1/058* (2013.01); *C22C 1/1084* (2013.01); *C22C 26/00* (2013.01); *B22F 1/0025* (2013.01); *B22F 2998/00* (2013.01); *B22F 2999/00* (2013.01); *C22C 2026/001* (2013.01); *C22C 2026/002* (2013.01)

(56) References Cited

U.S. PATENT DOCUMENTS

| | | | |
|---|---|---|---|
| 7,575,621 B2 | 8/2009 | Vanheusden et al. | |
| 7,704,553 B2 | 4/2010 | Watson et al. | |
| 8,110,510 B1* | 2/2012 | Fanfair et al. | 438/800 |
| 8,703,235 B2* | 4/2014 | Southward et al. | 427/215 |
| 2007/0265379 A1* | 11/2007 | Chen et al. | 524/404 |
| 2007/0292699 A1* | 12/2007 | Watson et al. | 428/457 |
| 2010/0002282 A1 | 1/2010 | Agrawal et al. | |
| 2010/0072434 A1* | 3/2010 | Lee et al. | 252/514 |

OTHER PUBLICATIONS

Busbee et al., An improved synthesis of high-aspect ratio gold nanorods, Adv. Mater., vol. 15, No. 5, 2003, 414-416.*

Sun et al., "Ultrathin single crystal Pt nanowires on N-doped carbon nanotubes", Chem. Comm. 2009, 7048-7050.*

Ah et al., Size-controlled synthesis of Machinable single crystalline gold nanoplates, Chem. Mater. 2005, 17, 5558-5561.*

Qu at al., "In situ fabrication of noble metal nanoparticles modified multiwalled carbon nanotubes and related aelectrocatalysis," Electroanalysis, 2007, pp. 2410-2415, vol. 20, No. 22.

Liu et al., "Carbon nanotubes filled with long continuous cobalt nanowires," Appl. Phys., 2000, pp. 673-675, Vo. A 70.

Gao et al., "Carbon nanotubes filled with metallic nanowires," Carbon, 2004, pp. 47-52, vol. 42.

Lusk and Hamm, "Ab initio study of toroidal carbon nanotubes with encapsulated atomic metal loop," Phys. Rev. B 2007, pp. 125422-1-125422-6, vol. B 76.

* cited by examiner

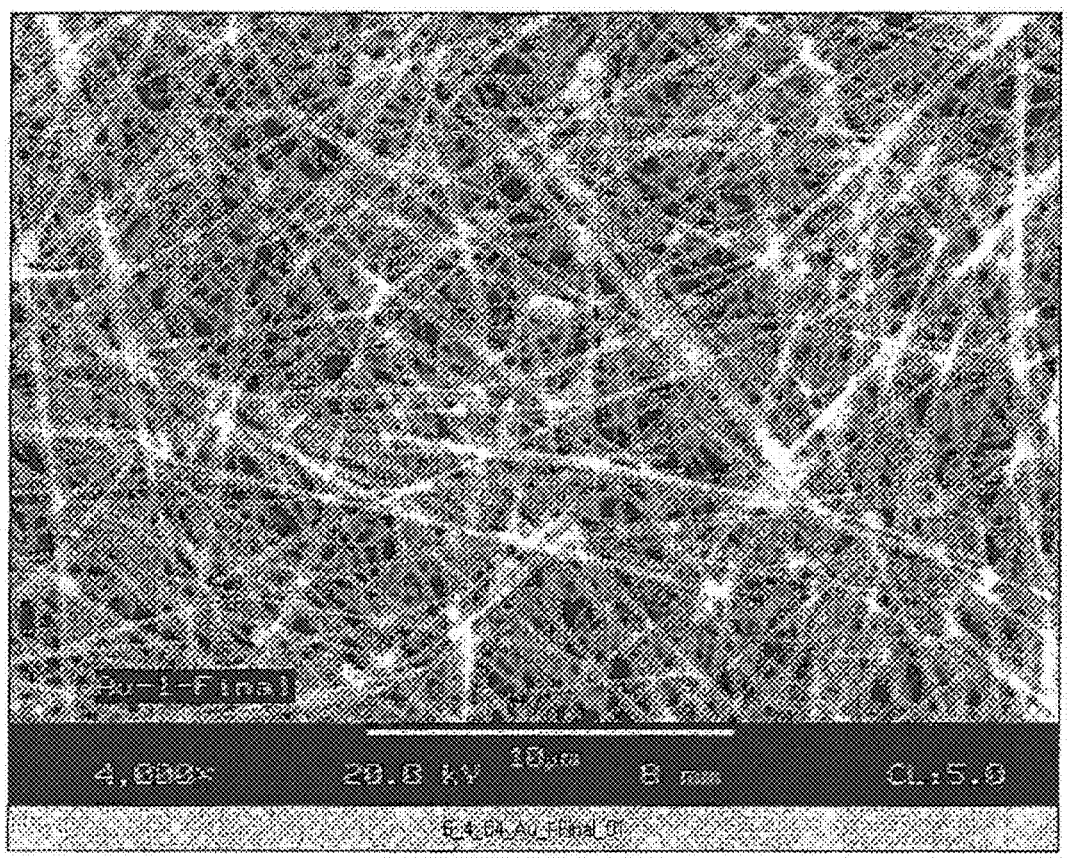

PREPARATION OF METAL NANOWIRE DECORATED CARBON ALLOTROPES

CROSS-REFERENCE TO RELATED APPLICATIONS

This patent application is a divisional of U.S. patent application Ser. No. 13/082,734, filed Apr. 8, 2011, which claims the benefit of priority to U.S. Provisional Patent Application No. 61/327,189, filed on Apr. 23, 2010, and is a continuation-in-part of U.S. patent application Ser. No. 11/710,386, filed Feb. 23, 2007, issued as U.S. Pat. No. 7,704,553, which claims the benefit of priority to U.S. Provisional Patent Application No. 60/780,173, filed Mar. 6, 2006.

STATEMENT REGARDING FEDERALLY SPONSORED RESEARCH OR DEVELOPMENT

This invention was made in part by employees of the United States Government and may be manufactured and used by or for the Government of the United States of America for governmental purposes without the payment of any royalties thereon or herefor.

BACKGROUND OF THE INVENTION

The present invention relates generally to metallic nanowire decorated carbon allotropes, and specifically to methods of preparing such allotropes and dispersing them into polymeric matrices.

It is known that materials with improved mechanical properties, such as thermal conductivity, can be created by blending metallic nanowires, with various polymers. In these methods, metallic nanowires were synthesized by a templateless method, isolated, and subsequently blended with various polymers. However, in these methods, the inclusion of the nanowires into an organic matrix was hampered by poor dispersability of pure nanowire additives into polymeric matrices. Continuous ways are being sought to take advantage of metallic nanowires and incorporate such materials into composite polymeric matrices.

BRIEF SUMMARY OF THE INVENTION

In view of the foregoing, it is an object of the invention to provide methods of using carbon allotropes as anchors on which to grow surface metallic nanowires and to alleviate processing problems encountered with pure nanowire additives in polymeric matrices. The homogeneous dispersion of carbon allotropes into polymeric matrices has generally been mastered and similar techniques can be used to process nanowire-carbon allotrope polymer composites.

It is a related object of the invention to provide the ability to use nanometer-sized particles of metals seeded onto carbon allotropes as a source of starting material to prepare the metal decorated allotropes, which may be used as novel materials or tailored into specific catalysts or even ultimately modified to create a polymeric matrix reinforced with such allotropes.

These objects are achieved by the present invention, which provides in one embodiment a method of preparing metal nanowire decorated carbon allotropes comprises providing a plurality of seed templates, each seed template comprising a carbon allotrope containing a plurality of metallic crystalline seeds; and reacting the plurality of seed templates in solution with a polymeric passivating reagent to form a zero valent metallic nanowire from each metallic crystalline seed. The carbon allotrope may be selected from the group consisting of buckminsterfullerene, carbon nanotube, graphite, and exfoliated graphite. The metallic crystalline, seeds may be selected from the group consisting of silver, gold, platinum, palladium, and nickel. The method may further comprise controlling a diameter of the metal nanowires by controlling a diameter of the metallic crystalline seeds. The method may further comprise controlling a density of the metal nanowires by controlling a density of the metallic crystalline seeds.

In another embodiment of the invention, a method of preparing a polymeric matrix comprises preparing a plurality of metal nanowire decorated carbon allotropes and dispersing the plurality of metal nanowire decorated carbon allotropes in a polymer. Preparing a plurality of metal nanowire decorated carbon allotropes may comprise providing a plurality of seed templates, each seed template comprising a carbon allotrope containing a plurality of metallic crystalline seeds; and reacting the plurality of seed templates in solution with a polymeric passivating reagent to form a zero valent metallic nanowire from each metallic crystalline seed. The carbon allotrope may be selected from the group consisting of buckminsterfullerene, carbon nanotube, graphite, and exfoliated graphite. The metallic crystalline seeds may be selected from the group consisting of silver, gold, platinum, palladium, and nickel. The method may further comprise controlling a diameter of the metal nanowires by controlling a diameter of the metallic crystalline seeds. The method may further comprise controlling a density of the metal nanowires by controlling a density of the metallic crystalline seeds.

In yet another embodiment of the invention, a polymeric matrix comprises a plurality of metal nanowire decorated carbon allotropes homogeneously dispersed inside a polymer. The plurality of metal nanowire decorated carbon allotropes may be prepared by a method that comprises providing a plurality of seed templates, each seed template comprising a carbon allotrope containing a plurality of metallic crystalline seeds, and reacting the plurality of seed templates in solution with a polymeric passivating reagent to form a zero valent metallic nanowire from each metallic crystalline seed. The carbon allotrope may be selected from the group consisting of buckminsterfullerene, carbon nanotube, graphite, and exfoliated graphite. The metallic crystalline seeds may be selected from the group consisting of silver, gold, platinum, palladium, and nickel.

BRIEF DESCRIPTION OF THE SEVERAL VIEWS OF THE DRAWING(S)

FIG. 1 is a drawing prepared from a high resolution scanning electron micrograph (HRSEM) of a metal nanowire decorated carbon allotrope prepared employing the exemplary procedure detailed below.

DETAILED DESCRIPTION OF THE INVENTION

Embodiments of the invention provide a novel polyol soft solution method for producing metallic nanowire decorated carbon allotropes, thereby enabling the production of novel polymeric matrices and the development of material systems and with improved thermal conductivity (among other benefits such as, but not limited to, physical, mechanical and/or electrical properties).

Embodiments of the invention enable nanowire growth of a variety of metals on a variety of metal seeded carbon allotropes. The metallic, crystalline seeds serve as growth sites for the metal nanowires. The metals include but are not limited to silver, gold, platinum, palladium, and nickel. The carbon allotropes include but are not limited to buckminsterfullerene, carbon nanotube, graphite, and exfoliated graphite. Methods of embodiments of the invention provide a versatile way of producing metallic nanowires of controlled diameter sizes and distribution density on the surface of carbon allotropes. The net result is that the nanowire density and the nanowire-to-carbon allotrope ratio can be adjusted to adjust the properties needed for specific applications.

Embodiments of the invention may use metal decorated carbon allotropes produced using the methods described in U.S. Pat. No. 7,704,553, the contents of which are incorporated herein in their entirety. However, the method of embodiments of the invention is not limited to using the metal decorated carbon allotropes produced using the methods described in U.S. Pat. No. 7,704,553. Any metal seeded carbon allotrope, regardless of method of preparation, can be used as a starting material.

In an exemplary aspect, a process preparing metal seeded carbon allotrope templates begins with depositing very small (viz., nanometer-sized) metal particles onto a substrate (such as a carbon allotrope) in the absence of aqueous solvents, organic solvents, and reducing agents, and without any required pre-treatment of the substrate. An admixture of a metal compound and a substrate is prepared by dry mixing a chosen amount of a metal compound with a chosen amount of a substrate. Energy is then supplied to the admixture in an amount sufficient to reduce the metal ion in the metal compound to a valence of zero. Dry mixing of the metal compound and the substrate is preferably continued until substantial uniformity of the admixture is achieved, as determined, for example, by visual inspection. A wide variety of standard dry mixing techniques may be employed, including, but not limited to grinding with a mortar and pestle, mechanical shaking, ball milling, and ultrasonic agitation, among many others. After mixing is complete, energy is supplied to the admixture, advantageously in the form of heat, as supplied by a standard oven. However other forms of energy may be employed with success such as microwave energy, as in a microwave oven, among others. The atmosphere surrounding the admixture may be air, or an inert gas such as nitrogen. If a standard oven in employed, a preferred temperature for heat treatment is from about 250 degrees Celsius to about 350 degrees Celsius, for a time between about 0.5 hours to about 6 hours, with about 2 hours to about 4 hours being preferable. Although a number of substrates may be employed in the instant process, carbon allotropes have been used very advantageously. Carbon allotropes are structurally differentiated forms of the element carbon. Examples of acceptable Carbon allotropes are: amorphous carbon, carbon nanofibers, carbon nanofoam, diamond, fullerene, graphite, exfoliated graphite, single-walled carbon nanotubes, multi-walled carbon nanotubes, double-walled carbon nanotubes, lonsdaleite, and aggregated diamond nanorods. Preferred carbon allotropes are: amorphous carbon, graphite, exfoliated graphite, single-walled carbon nanotubes, double-walled carbon nanotubes, and multi-walled carbon nanotubes. Preferred metals are those listed in the periodic table as transition metals of Group VIIIA (Fe, Go, Ni, Ru, Rh, Pd, Os, Ir, and Pt), those of Group IB (Cu, Ag, and Au) and those of Group IIB (Zn, Cd, and Hg), including mixtures thereof. The metals Pd, Pt, Ag, and Au are especially preferred. The metals are in the form of a compound with another element or group. Preferable elements in the metal compound are halides, especially chloride. Preferable groups in the metal compound are organic carboxylates, and especially acetates. The concentration of the metal compound relative to the substrate, e.g., the carbon allotrope, influences the particle size of the metal that is subsequently deposited. Metal compound concentrations that ultimately result in final zero valence metal particle concentrations on the carbon allotrope of up to 50% by weight are preferable. The compositions are characterized by high resolution scanning electron microscopy (HRSEM) to determine metal particle size and distribution. The oxidation state of the metal is determined by x-ray photoelectron spectroscopy and/or wide angle x-ray diffraction.

The exemplary seed template compositions comprised of metal particles distributed onto the surfaces and/or within the interstices of various substrates, especially various forms of carbon, of the present invention can ultimately be used to produce polymer composites by combining them with commodity and engineering plastics to produce novel materials with advantageous characteristics. The term "polymer composites," as used herein, refers to a composition that comprises at least one substrate, e.g., one form of carbon with metal particles distributed thereon and at least one polymer. The polymer matrix or matrices may be commodity or engineering plastics such as polycarbonate, polyacrylate, polyacrylonitrile, polyester, polyamide, polystyrene (including high impact strength polystyrene), polyurethane, polyurea, polyurethaneurea, polyepoxy, poly(acrylonitrile butadiene styrene), polyimide, polyarylate, poly(arylene ether), polyethylene, polypropylene, polyphenylene sulfide, poly (vinyl ester), polyvinyl chloride, bismaleimide polymer, polyanhydride, liquid crystalline polymer, cellulose polymer, or any combination thereof. These are commercially available from, for example, GE Plastics, Pittsfield, Mass.; Rohm &. Haas Co., Philadelphia, Pa.; Bayer Corp.—Polymers, Akron, Ohio; Reichold; DuPont; Huntsman LLC, West Deptford, N.J.; BASF Corp., Mount Olive, N.J.; Dow Chemical Co., Midland, Mich.; GE Plastics; ExxonMobil Chemical Corp., Houston, Tex.; ExxonMobil/Mobay Chemical Corp., Kansas City, Kans.; Goodyear Chemical, Akron, Ohio; BASF Corp, 3M Corp., St, Paul, Minn.; Solutia, Inc., St. Louis, Mo.; DuPont; and Eastman Chemical Co., Wilmington, Del. and Kingsport, Tenn., respectively). The polymer composites are produced via standard blending, mixing, or compounding the constituent materials. The polymer composites of the present invention may comprise other components, such as fillers, surfactants, organic binders, polymeric binders, crosslinking agents, coupling agents, anti-dripping agents, heat stabilizers, antioxidants, colorants, inks, dyes, or any combination thereof. The polymer composites of the present invention are used as coatings, or they are used to fabricate articles, such as free-standing films, fibers, fabrics, foams, molded and laminated articles, tubes, adhesives, and fiber reinforced articles. These articles are well-suited for many applications requiring thermal conductivity, electrical conductivity, antibacterial activity, catalytic activity, and combinations thereof.

Synthesis of metallic nanowires or nanorods in accordance with embodiments of the invention use a synthetic method of which zero valent metal nanometer sized clusters serve as the seed for unidirectional growth of metallic nanowires. The radii of resulting nanowires are controlled via the diameter of the metal "seeds" from which the nanowire growth commences. The seeds can be introduced via in-situ method from which the nanowires are grown, or they can be introduced via metallic nanometer-decorated substrates, such as those described herein, of metallic decorated carbon allotropes. The metallic clusters on the carbon allotropes become the "seed sites" from which nanowire growth occurs. This synthetic process is particularly useful where the properties unique to high aspect ratio additives are desirable in a hybrid material and enhanced further through functionalized metal nanowires. Traditional methods of hybrid material preparations are difficult to extend to nanometer sized additives. In particular, dispersion issues render a non-homogenous hybrid material with inconsistent physical properties, and ultimately not fit for any conceivable applications. This invention circumvents those problems where nanometer-sized carbon allotropes are desired within a hybrid system, along with the additional properties that are desired specific to zero-valent nanocluster, nanorods, or nanowires which enhance a hybrid material system, and extend the applications for such material use.

In at least some embodiments of the invention, the metal seeded carbon allotropes are reacted in solution, forming zero valent metallic nanowires at the seeded sites. The preferred polyol solvent used (for example, ethylene glycol) can be both the solvent and reducing agent. A polymeric passivating reagent, which selects for anisotropic growth, is also used in the reaction to facilitate nanowire formation. Such an exemplary passivating reagent is poly (vinyl-pyrolidone), which functions as the capping or passivating agent. Other similar solvents, reducing agents, capping and/or passivating agents may be selected based on similar chemical functionalities as known to those of ordinary skill in the art. The instantly inventive reaction, carried out in the presence of metal decorated carbon allotropes, initiates the synthesis of coordinated metallic growth from each "seed" from which each unidirectional nanowire emerges. Metal decorated carbon allotropes serve as the substrate here, and the nanometer-sized metal decorations serve as "seed sites" for synthesis of nanowires which are anchored to the selected carbon substrate. The resulting structure resembles a porcupine, where carbon allotropes have metallic wires of nanometer dimensions that emanate from the seed sites on the carbon allotrope. These sites are populated by nanowires having the same diameter as the starting nanoparticle diameter. The metal seeded carbon allotropes provide reliable and homogenous seed diameters. The density of nanowires can be adjusted via several approaches: through the initial density of metallic particles on the carbon allotrope, through the concentration of the metal-decorated allotrope starting material, through the concentration of the unreduced metallic precursor starting solution, and through use of a competing seed site which gives rise to a heterogeneous batch composition of nanowires both attached and unattached to carbon allotropes. Uniformity of the aspect ratio of nanowires is dependent on the dimensions of the metallic crystalline seed. The aspect ratio of the nano wires can be controlled via selection of the diameter of nanowire and the ratio of carbon allotrope, and the metallic nanowire density is very easily controlled via the initial concentration of surface zero valent nanoparticle density on the carbon allotrope at the inception of reaction.

The use of carbon allotropes as anchors for the metallic nanowire growth alleviates processing problems encountered with pure nanowire additives, especially inhomogeneous dispersion difficulties. The homogenous dispersion of carbon allotropes into polymeric matrices has already been generally mastered by those of ordinary skill in the art, and the known techniques can be directly applied to the nanowire-carbon allotrope composites. The nanowires synthesized on the surface of the metal decorated allotropes are readily dispersed into the matrix as they are attached to the surface of the decorated carbon allotropes.

Methods of embodiments of the invention allow for the creation of metallic nanowire decorated carbon allotropes using readily available chemicals, modest reaction temperatures and time, ease of process and isolation, common laboratory equipment, and easy scale-up. The resulting metal nanowire decorated carbon allotropes are useful in and of themselves as catalysts for a variety of chemical processes, and can also be combined with polymeric or other materials to improve certain physical, mechanical, and/or electrical properties.

Embodiments of the invention cover many different combinations fir both metal and carbon allotropes. The procedure described in detail below utilizes silver for the nanowire synthesis, gold for the "metallic decorations," and multi-walled carbon nanotubes (MWCN) for the carbon allotrope. However, it should be appreciated that this specific combination represents only one of many reaction possibilities. For example, zero valent metallic nanowires and/or nanorods may include, e.g., silver, gold, palladium, platinum, nickel, etc. Metallic decorated carbon allotropes, where M=zero valent metallic nanocluster, may include, e.g., M-SWCN, M-MWCN, M-exfoliated graphite, etc. Whichever carbon allotrope is used, the metal "decorations" will serve as the seed sites for nanowire/nanorod growth. The carbon allotrope will not affect the chemistry that occurs with nanowire growth. As noted above, the density of the "metal decorations" can be varied. The density of nanowires grown is dependent on the number of available sites and the surface area exposure of such sites. The diameter of the metal decorations will influence the resulting nanowire/nanorod diameter and the length of resulting nanowires/nanorods. Of benefit, the large aspect ratio moieties such as those prepared according to embodiments of the present invention give rise to material properties which are enhanced and superior with very low loading because of the tremendous surface area available for interaction.

Having generally described the invention, a more complete understanding thereof may be obtained by reference to the following exemplary embodiment, which is provided for purposes of illustration only and is not intended to limit the invention in any way.

An exemplary embodiment of the invention comprises silver nanowire-decorated multi-walled carbon nanotubes (Ag-MWCN). Materials used in the example production of the silver nanowire-decorated multi-walled carbon nanotubes included ethylene glycol (EG) (99.8% anhydrous), poly (vinyl pyrrolidone) (PVP) (55,000 M.W.), silver(I) nitrate ($AgNO_3$, 99.97%), ethanol (95%), and gold-decorated multi-walled carbon nanotubes (Au-MWCN). The gold-decorated multi-walled carbon nanotubes were prepared using the methods described in U.S. Pat. No. 7,704,553 for use as the reacting substrate for directed metallic nanowire growth. It was believed that nanowire/nanorod growth occurred upon the nanometer-sized metal clusters, also known as "metallic decorations." These "metallic decorations" acted as metallic "seeds" upon which the continued metallic nanowire growth occurred. The diameter size of the metallic clusters available for surface reaction upon the carbon allotrope influenced the diameter of resulting nanowires and/or nanorods. The poly (vinyl pyrrolidone) used in the silver nanowire synthesis functioned as a passivating/capping agent. Passivation of a metallic face was believed to have rendered the passivated face inactive, with the resulting suppression of cluster growth predominately seen for metallic silver. With passivation, the silver growth occurred on a non-passivated face, resulting in unidirectional, wirelike growth of silver.

The production of silver nanowire-decorated multi-walled carbon nanotubes began by in a clean three-necked round-bottom flask, heating 30 mL of EG to 165° C. with magnetic stirring by means of a silicon oil bath. In a volumetric flask, silver nitrate, 0.424 g (2.5 mmol), was dissolved in 25 mL EG (0.1 M solution). In a second volumetric flask, 55,000 M.W. PVT, 0.488 g (4.4 mmol) was dissolved in 25 ML EG (0.176 M solution). Using an analytical balance, the quantity of Au-MWCN required for [Au]=II micromols was measured.

Once the stirring EG reached 165° C., Au-MWCN was introduced into the reaction flask. When an equilibrium temperature of 165° C. had been maintained for about five minutes, the silver nitrate solution was added over 7.5 minutes dropwise via a syringe pump, from two 10-mL syringes (pump setting@ 1.2 mL/min). The solution appeared to turn a little yellow upon addition of the silver solution, followed by yellowish-gray hue toward the end of reaction. Immediately upon the completion of silver solution addition, began the dropwise addition of the PVP solution via syringe pump, from two 10-mL syringes (pump setting at 0.4/min.) The solution hue appeared iridescent and opaque, transforming to a creamy tan with silvery highlights after about thirty minutes of reaction time. The reaction flask was removed from the heat after about one hour.

The product, Ag-MWCN, was purified by centrifugation at 2500 rpm for thirty minutes; the supernatant was discarded, the Ag-MWCN was centrifuged twice more at 2500 rpm for thirty minutes in ethanol, discarding the supernatant each time. The Ag-MWCN was allowed to dry at room temperature, leaving a gray powder remaining. Pentagonally twinned silver nanowires having diameters of approximately 100 nm (diameters corresponding to the diameters of the metallic nanocluster "decorations") and of an approximate length of 2 to 30 microns were isolable. FIG. 1 shows a high resolution scanning electron micrograph (HRSEM) of a nanowire "decorated" substrate prepared in accord with the procedure above, and it was also noted that no significant discernible difference was observed over a preparation time range between approximately 30 to 90 minutes.

Embodiments of the invention may be used for inorganic-organic hybrid materials where the separate properties of carbon allotrope and metallic additives are indicated for various applications that traditionally would only include the selection of one additive or the other for inclusion into the host matrix material. The metal nanowire decorated carbon allotropes are useful as catalysts in a variety of chemical reactions. The metal can be varied, and the aspect ratio of the nanowire provides for very large surface areas while using small amounts of potentially expensive metals. These features are particularly attractive for applications as catalysts in fuel cells, organic transformations, and polymerization processes. The unique attributes and variety in terms of the combination of properties that are achievable with these materials also points to their use in a variety of sensor applications. The metal nanowire decorated carbon allotropes can also be blended with polymers and other materials leading to unique combinations of physical, mechanical, electrical, and thermal properties. This invention has potential government and commercial, such as chemical, commodity plastics, pharmaceutical and biomedical, applications.

Some specific examples of potential uses for metal nanowire decorated carbon allotropes of embodiments of the invention include catalysts for chemical transformations, energy absorbing materials and energy dissipating materials, selective gas and chemical sensors and as an antimicrobial agent, which is a common use of some zero valent metals such as silver. Metal nanowire decorated carbon allotropes of embodiments of the invention may also be useful for organic transformations, fuel cells, catalytic polymerization, catalytic membranes, heat sensing membranes, gas selective permeable membranes, and heat sensitive detecting membranes.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted, Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A method of preparing a polymer composite, the method comprising:
provide a plurality of seed templates, each seed template comprising a carbon allotrope containing a plurality of metallic crystalline seeds;
reacting the plurality of seed templates in a metal salt solution with a polymeric passivating reagent to form a zero valent metallic nanowire from each crystalline seed;
recovering a plurality of metal nanowire decorated allotropes; and substantially dispersing the plurality of metal nanowire decorated carbon allotropes in a polymer matrix.

2. The method of claim 1, wherein the carbon allotrope is selected from the group consisting of buckminsterfullerene, carbon nanotube, graphite, and exfoliated graphite.

3. The method of claim 1, wherein the seeds are selected from the group consisting of silver, gold, platinum, palladium, and nickel.

4. The method of claim 1, further comprising:

controlling a diameter of the metal nanowires by controlling a diameter of the crystalline seeds.

5. The method of claim 1, further comprising:

controlling a density of the metal nanowires by controlling a density of the crystalline seeds.

6. A polymer composite comprising:

a plurality of metal nanowire decorated carbon allotropes substantially dispersed in a polymer matrix;

wherein the plurality of metal nanowire decorated carbon allotropes has zero valent metallic nanowires originating from crystalline seeds on a plurality of carbon allotropes.

7. The composite of claim 6, wherein the plurality of metal nanowire decorated carbon allotropes are prepared by a method comprising:

providing a plurality of seed templates, each seed template comprising a carbon allotrope containing a plurality of crystalline seeds; and reacting the plurality of seed templates in a metallic solution with a polymeric passivating reagent to form a zero valent metallic nanowire from each crystalline seed.

8. The composite of claim 7, wherein the carbon allotrope is selected from the group consisting of buckminsterfullerene, carbon nanotube, graphite, and exfoliated graphite.

9. The composite of claim 7, wherein the metal nanowire is selected from the group consisting of silver, gold, platinum, palladium, and nickel.

* * * * *